(12) United States Patent
Aramon Bajestani et al.

(10) Patent No.: US 11,556,687 B2
(45) Date of Patent: Jan. 17, 2023

(54) METHOD AND SYSTEM FOR SOLVING MIXED-INTEGER PROGRAMMING PROBLEMS USING A FEASIBILITY PUMP TECHNIQUE EMBEDDED IN A MONTE CARLO SIMULATION FRAMEWORK

(71) Applicant: 1QB INFORMATION TECHNOLOGIES INC., Vancouver (CA)

(72) Inventors: Maliheh Aramon Bajestani, Vancouver (CA); Nicolas Pradignac, Prévessin-Moëns (FR); Helmut Katzgraber, Kirkland, WA (US)

(73) Assignee: IQB INFORMATION TECHNOLOGIES INC., British Columbia (CA)

( * ) Notice: Subject to any disclaimer, the term of this patent is extended or adjusted under 35 U.S.C. 154(b) by 163 days.

(21) Appl. No.: 16/894,423

(22) Filed: Jun. 5, 2020

(65) Prior Publication Data

US 2020/0387655 A1    Dec. 10, 2020

Related U.S. Application Data

(60) Provisional application No. 62/858,543, filed on Jun. 7, 2019.

(51) Int. Cl.
*G06F 30/331*  (2020.01)
*G06F 17/11*  (2006.01)
*G06F 111/08*  (2020.01)

(52) U.S. Cl.
CPC ............ *G06F 30/331* (2020.01); *G06F 17/11* (2013.01); *G06F 2111/08* (2020.01)

(58) Field of Classification Search
CPC ..... G06F 30/331; G06F 17/11; G06F 2111/08
USPC ............................................................ 703/2
See application file for complete search history.

(56) References Cited

U.S. PATENT DOCUMENTS

| | | | |
|---|---|---|---|
| 2004/0059627 A1* | 3/2004 | Baseman | G06Q 10/06375 705/7.41 |
| 2010/0226765 A1* | 9/2010 | Yang | F04D 17/127 415/203 |

OTHER PUBLICATIONS

Fischetti, Matteo et al., "The Feasibility Pump", Mathematical Programming, vol. 104, pp. 91-104 (Sep. 2005).
Fischetti, M. et al., "Feasibility pump 2.0", Math. Prog. Comp., vol. 1, pp. 201-222 (2009).

(Continued)

*Primary Examiner* — Juan C Ochoa
(74) *Attorney, Agent, or Firm* — Pearl Cohen Zedek Latzer Baratz LLP

(57) ABSTRACT

A method and a system are disclosed for solving a mixed-integer programming problem, the method comprising obtaining an indication of a mixed-integer programming optimization problem; until a performance criterion is met: providing the mixed-integer programming optimization problem to an optimization oracle adapted for solving the mixed-integer programming optimization problem using a feasibility pump technique and comprising an optimization solver, initializing parameters of an optimization oracle and an initial solution pair, the parameters comprising Monte-Carlo simulation parameters, a list of neighborhood functions and a measure of fractionality, and performing iterative calls to the optimization solver until a stopping condition is met; and providing at least one corresponding solution obtained from the optimization solver.

7 Claims, 5 Drawing Sheets

(56) References Cited

OTHER PUBLICATIONS

N. L. Boland, et al., "A New Approach to the Feasibility Pump in Mixed Integer Programming", SIAM Journal on Optimization, 2012, vol. 22, No. 3: pp. 831-861.
Santanu S. Dey, et al., "Improving the Randomization Step in Feasibility Pump", Society for Industrial and Applied Mathematics Journal on Optimization, vol. 28, No. 1, pp. 355-378 (2018).
Carlos E. Andrade, et al., "A hybrid primal heuristic for finding feasible solutions to mixed integer programs", European Journal of Operational Research, vol. 263, Issue 1, 2017, pp. 62-71.
Berthold, T., et al., "Ten years of feasibility pump, and counting", EURO Journal on Computational Optimization, vol. 7, pp. 1-14 (2019).
S. Kirkpatrick, et al., "Optimization by Simulated Annealing", Science, May 1983, vol. 220, No. 4598, pp. 671-680.

\* cited by examiner

METHOD AND SYSTEM FOR SOLVING MIXED-INTEGER PROGRAMMING PROBLEMS USING A FEASIBILITY PUMP TECHNIQUE EMBEDDED IN A MONTE CARLO SIMULATION FRAMEWORK

CROSS-REFERENCE TO RELATED APPLICATION

This patent application claims priority of U.S. Provisional Patent Application No. 62/858,543, filed on Jun. 7, 2019 and entitled "Method and system for solving mixed-integer programming problems using a feasibility pump technique embedded in a Monte Carlo simulation framework", which is incorporated herein by reference in its entirety.

FIELD OF THE INVENTION

This technology is directed towards solving mixed-integer programming problems. More precisely, this technology pertains to solving mixed-integer programming problems using feasibility pump techniques embedded in a Monte Carlo simulation framework.

BACKGROUND OF THE INVENTION

Mixed-integer programming (MIP) is the most common approach for solving a wide range of discrete optimization problems across a variety of domains, such as manufacturing, transportation, healthcare, energy, and finance. Finding a feasible solution to a mixed-integer programming problem is an important NP-complete problem. In the last few decades, many heuristic algorithms are developed to find a feasible solution to this problem faster, relying on conventional off-the-shelf CMOS hardware.

The feasibility pump (FP) algorithm, a projection-based technique introduced by Fischetti et al. (M. Fischetti, F. Glover, A. Lodi, The feasibility pump, Mathematical Programming 104, 91 (2005)) is one of the state-of-the-art MIP heuristic techniques. The feasibility pump algorithm is an iterative algorithm that generates two solution sequences, one satisfying the linear constraints and the other one satisfying the integrality constraints. The main objective of the algorithm is to decrease the distance between the solutions generated in consecutive iterations until convergence. Despite there being no guarantee that a feasible solution will be obtained, it is shown that the feasibility pump algorithm is very efficient in practice. As a result, it has motivated many subsequent new algorithms such as FP2.0 (M. Fischetti, D. Salvagnin, Feasibility pump 2.0, Mathematical Programming Computation 1, 201 (2009)) and FPC (N. L. Boland, A. C. Eberhard, F. Engineer, A. Tsoukalas, A new approach to the feasibility pump in mixed integer programming, SIAM Journal on Optimization 22, 831 (2012)).

The original feasibility pump algorithm has three main components: 1) rounding a fractional solution to an integral solution, 2) projecting an integral solution onto the solution space subject to linear constraints, and 3) perturbing the infeasible integral solution when the algorithm stalls. The FP2.0 algorithm enhances the rounding step by incorporating a constrained propagation mechanism to tighten the variable domains, generating an integral solution that is closer to feasibility. The feasibility pump algorithm with cutting planes (FPC) improves the projection step where the cutting planes are utilized to shrink the solution space by removing the feasible solutions that are not integral.

The main drawback of the feasibility pump-based algorithms is cycling, that is, the same sequence of solutions in visited repeatedly. As a result, these algorithms suffer from fast convergence to local optima. Perturbation is the common approach used to address this drawback. The idea behind most of the perturbation techniques is to select a subset of variables to be altered based on a measure of fractionality. (See S. S. Dey, A. Iroume, M. Molinaro, D. Salvagnin, Improving the randomization step in feasibility pump, SIAM Journal on Optimization 28, 355 (2018); C. E. Andrade, S. Ahmed, G. L. Nemhauser, Y. Shao, A hybrid primal heuristic for finding feasible solutions to mixed integer programs, European Journal of Operational Research 263, 62 (2017); T. Berthold, A. Lodi, D. Salvagnin, Ten years of feasibility pump, and counting, EURO Journal on Computational Optimization 1, 14 (2017)) Relying on perturbation to diversify the search space when the algorithm has been detected to be cycling is a reactive approach to escaping from local minima.

There is a need for a method and a system that will overcome at least one of the above-identified drawbacks.

SUMMARY OF THE INVENTION

According to a broad aspect, there is disclosed a method for solving a mixed-integer programming problem, the method comprising obtaining an indication of a mixed-integer programming optimization problem; until a performance criterion is met: providing the mixed-integer programming optimization problem to an optimization oracle adapted for solving the mixed-integer programming optimization problem using a feasibility pump technique embedded in a Monte Carlo simulation framework, the optimization oracle comprising an optimization solver, initializing parameters of the optimization oracle and an initial solution pair, the parameters comprising Monte-Carlo simulation parameters, a list of neighborhood functions and a measure of fractionality, and performing iterative calls to the optimization solver until a stopping condition is met; and providing at least one corresponding solution obtained from the optimization oracle.

In accordance with one or more embodiments, the optimization oracle comprises a digital computer, further wherein the optimization solver comprises a field-programmable gate array operatively coupled to the digital computer.

In accordance with one or more embodiments, the optimization oracle comprises a digital computer, further wherein the optimization solver comprises an application-specific integrated circuit operatively coupled to the digital computer.

In accordance with one or more embodiments, the obtaining of an indication of a mixed-integer programming problem comprises providing data representative of an objective function of the mixed-integer programming problem; providing data representative of linear constraints associated with the mixed-integer programming problem; and providing data representative of integral decision variables of the mixed-integer programming problem.

In accordance with one or more embodiments, the initializing of the parameters of the optimization oracle and the initial solution pair further comprises generating an infeasible integral solution; calling the optimization solver to generate a feasible relaxed solution; setting a current solution pair to comprise the infeasible integral solution and the feasible relaxed solution.

In accordance with one or more embodiments, the performing of the iterative calls to the optimization solver comprises receiving a current Monte Carlo simulation step; receiving a current neighborhood function; calling the optimization solver to generate a new solution pair; using the measure of fractionality to quantify a fitness of each solution pair; if an acceptance criterion is met, updating a current solution pair with the new solution pair; updating the list of neighborhood functions; if the list of the neighborhood functions is empty: incrementing the Monte Carlo step by one and populating the list of neighborhood functions with all the provided functions.

In accordance with a broad aspect, there is disclosed a non-transitory computer readable storage medium for storing computer-executable instructions which, when executed, cause a digital computer to perform a method for solving a mixed-integer programming problem, the method comprising obtaining an indication of a mixed-integer programming optimization problem; until a performance criterion is met: providing the mixed-integer programming optimization problem to an optimization oracle adapted for solving the mixed-integer programming optimization problem using a feasibility pump technique embedded in a Monte Carlo simulation framework and comprising an optimization solver and the digital computer, initializing parameters of the optimization oracle and an initial solution pair, the parameters comprising Monte-Carlo simulation parameters, a list of neighborhood functions and a measure of fractionality, and performing iterative calls to the optimization solver until a stopping condition is met; and providing at least one corresponding solution obtained from the optimization oracle.

In accordance with a broad aspect, there is disclosed an optimization oracle for solving a mixed-integer programming problem, the optimization oracle comprising a digital computer, and an optimization solver operatively connected to the digital computer, and wherein the solving of the mixed-integer programming problem comprises obtaining by the digital computer an indication of a mixed-integer programming optimization problem; until a performance criterion is met: providing the mixed-integer programming optimization problem to the optimization oracle adapted for solving the mixed-integer programming optimization problem using a feasibility pump technique embedded in a Monte Carlo simulation framework, initializing parameters of the optimization oracle and an initial solution pair, the parameters comprising Monte-Carlo simulation parameters, a list of neighborhood functions and a measure of fractionality, and performing iterative calls to the optimization solver until a stopping condition is met; and providing at least one corresponding solution obtained from the optimization oracle.

In accordance with a broad aspect, there is disclosed a digital computer comprising a central processing unit; a communication port for operatively connecting the digital computer to an optimization solver; a memory unit comprising an application for solving a mixed-integer programming problem using a feasibility pump technique embedded in a Monte Carlo simulation framework, the application comprising instructions for obtaining an indication of a mixed-integer programming optimization problem; instructions for, until a performance criterion is met providing the mixed-integer programming optimization problem to an optimization oracle adapted for solving the mixed-integer programming optimization problem using a feasibility pump technique embedded in the Monte Carlo simulation framework, the optimization oracle comprising the digital computer and the optimization solver, initializing parameters of the optimization oracle and an initial solution pair, the parameters comprising Monte-Carlo simulation parameters, a list of neighborhood functions and a measure of fractionality, and performing iterative calls to the optimization solver until a stopping condition is met; and instructions for providing at least one corresponding solution obtained from the optimization oracle.

Conversely to the perturbation methods mentioned above, Monte Carlo simulation techniques such as simulated annealing, replica exchange, and population annealing utilize randomization proactively through an aggressive diversification performed at the beginning of the search, then gradually guiding the search toward the region that has a higher potential of containing the global optimum.

In one or more embodiments of this invention, a new approach is developed that embeds the feasibility pump-based heuristics in a Monte Carlo simulation framework. In one embodiment, the original feasibility pump algorithm is embedded in a simulated annealing framework (S. Kirkpatrick, C. D. Gelatt, M. P. Vecchi, Optimization by simulated annealing, Science 220, 671 (1983)) called Annealed Feasibility Pump (AFP). In another embodiment, the FP2.0 can be embedded in a simulated annealing framework called Annealed Feasibility Pump 2.0 (AFP2.0).

It will be appreciated that the optimization solver used in the algorithms, such as AFP and AFP2.0, can be a software or a hardware architecture. In one embodiment, a CMOS application specific hardware, such as FPGA and GPU, can be used. In another embodiment, the algorithms may be utilized in a hybrid computing paradigm where some components of the algorithm are implemented on novel computing devices and the rest are implemented on conventional devices.

An advantage of one or more embodiments of the method disclosed herein is that they provide a method for solving an mixed-integer programming problem, the method utilizes randomization proactively by using the Monte Carlo simulation framework in order to reach the optimal solution faster than with prior art methods.

Another advantage of one or more embodiments of the system disclosed herein for solving the mixed-integer programming problem is that they operate faster than prior art apparatus used for solving the mixed-integer programming problem.

Another advantage of one or more embodiments of the method disclosed herein is that they may be implemented using FPGA or ASIC integrated circuit in one embodiment.

BRIEF DESCRIPTION OF THE DRAWINGS

In order that the invention may be readily understood, embodiments of the invention are illustrated by way of example in the accompanying drawings.

DETAILED DESCRIPTION OF THE INVENTION

Figure 1:
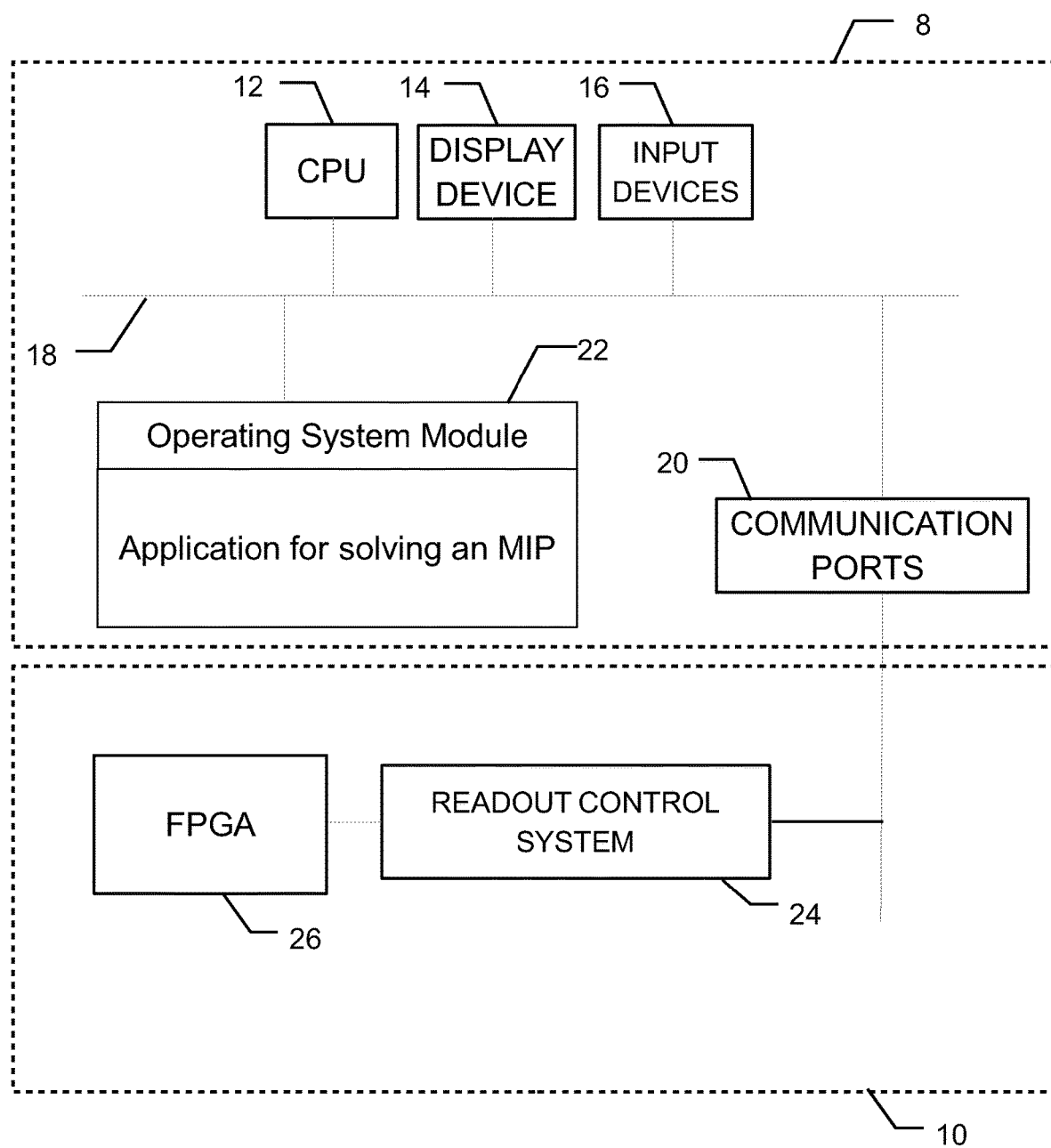
FIG. 1 is a diagram that shows an embodiment of a system for solving a mixed-integer programming problem, the system comprising an optimization oracle system comprising a digital system coupled to a non-conventional device.

In the following description of the embodiments, references to the accompanying drawings are by way of illustration of an example by which the invention may be practiced.

Terms

The term "invention" and the like mean "the one or more inventions disclosed in this application," unless expressly specified otherwise.

The terms "an aspect," "an embodiment," "embodiment," "embodiments," "the embodiment," "the embodiments," "one or more embodiments," "some embodiments," "certain embodiments," "one embodiment," "another embodiment" and the like mean "one or more (but not all) embodiments of the disclosed invention(s)," unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including," "comprising" and variations thereof mean "including but not limited to," unless expressly specified otherwise.

The terms "a," "an," "the" and "at least one" mean "one or more," unless expressly specified otherwise.

The term "plurality" means "two or more," unless expressly specified otherwise.

The term "herein" means "in the present application, including anything which may be incorporated by reference," unless expressly specified otherwise.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example," and thus do not limit the terms or phrases they explain. For example, in a sentence "the computer sends data (e.g., instructions, a data structure) over the Internet," the term "e.g." explains that "instructions" are an example of "data" that the computer may send over the Internet, and also explains that "a data structure" is an example of "data" that the computer may send over the Internet. However, both "instructions" and "a data structure" are merely examples of "data," and other things besides "instructions" and "a data structure" can be "data."

The term "i.e." and like terms mean "that is," and thus limit the terms or phrases they explain.

The term "non-conventional device" means a system comprising a device which is not solely traditional silicon-based. Non-limiting examples of non-conventional devices include FPGA and ASIC-base, computers which are specific-purpose computing devices.

The term "Mixed-integer programming problem (MIP)" refers to a minimization problem defined as:

$$\min\{f(x)|Ax \leq b, x_i \in \mathbb{Z} \ \forall i \in I\}$$

wherein $A \in \mathbb{R}^{m \times n}$, $b \in \mathbb{R}^m$, and $I \subseteq \{1, 2, \ldots, n\}$. The set of variable indices restricted to being integral is denoted by I. The lower and upper bounds on variables are included in the constraint matrix A.

The function $f(x)$ can take one of the following forms:

Linear in the form $c^T x$ where $c \in \mathbb{R}^n$ is a coefficient vector.

Quadratic in the form $x^T Q x$ where $Q \in \mathbb{R}^{n \times n}$ is a coefficient matrix.

The decision variables are represented as vector x. The number of decision variables is n.

It will be appreciated that a maximization mixed-integer programming problem may be transformed into minimization mixed-integer programming problem wherein the objective function $f(x)$ is replaced by $-f(x)$.

The term "LP-feasible polyhedron" is defined as:

$$\mathcal{P} = \{x : Ax \leq b\}$$

that includes all the feasible relaxed solutions in which the linear constraints are satisfied and the integrality constraints are relaxed.

The term "optimization solver" refers to a physical device or an algorithm that can determine the optimal solution to an optimization problem in the form:

$$\min\{f(x) : x \in \mathcal{P}\}$$

In one embodiment, the optimization solver is a field-programmable gate array (FPGA)-based linear programming solver.

In another embodiment, the optimization solver is an application-specific integrated circuit (ASIC)-based linear programming solver.

The term "optimization oracle" refers to a physical device or an algorithm comprising an optimization solver and an additional set of steps programmed as an outer algorithm to solve the mixed-integer programming problem. In one embodiment, the optimization oracle comprises a digital computer and an optimization solver.

The term "solution pair" refers to a pair of solutions comprising a feasible relaxed solution denoted as $\bar{x}$ and an infeasible integral solution denoted as $\tilde{x}$.

Neither the Title nor the Abstract is to be taken as limiting in any way as the scope of the disclosed invention(s). The title of the present application and headings of sections provided in the present application are for convenience only and are not to be taken as limiting the disclosure in any way.

Numerous embodiments are described in the present application and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

It will be appreciated that one or more embodiments of the invention may be implemented in numerous ways. In this specification, these implementations, or any other form that the invention may take, may be referred to as systems or techniques. A component such as a processor or a memory described as being configured to perform a task includes either a general component that is temporarily configured to perform the task at a given time or a specific component that is manufactured to perform the task.

With all this in mind, one or more embodiments of the present invention are directed to a method and a system for solving a mixed-integer programming problem using a feasibility pump technique embedded in Monte Carlo simulation framework.

Now referring to FIG. 1, there is shown a diagram that shows an embodiment of an optimization oracle system comprising a digital system 8 operatively coupled to a non-conventional device 10.

It will be appreciated that the digital computer 8 may be any type of digital computer.

In one embodiment, the digital computer 8 is selected from a group consisting of desktop computers, laptop computers, tablet PC's, servers, smartphones, etc. It will also be appreciated that, in the foregoing, the digital computer 8 may also be broadly referred to as a processor.

In the embodiment shown in FIG. 1, the digital computer 8 comprises a central processing unit 12, also referred to as a microprocessor, a display device 14, input devices 16, communication ports 20, a data bus 18 and a memory 22.

The central processing unit 12 is used for processing computer instructions. The skilled addressee will appreciate that various embodiments of the central processing unit 12 may be provided.

In one embodiment, the central processing unit 12 comprises a CPU Core i5 3210 running at 2.5 GHz and manufactured by Intel™.

The display device 14 is used for displaying data to a user. The skilled addressee will appreciate that various types of display device 14 may be used.

In one embodiment, the display device 14 is a standard liquid crystal display (LCD) monitor.

The input devices 16 are used for inputting data into the digital computer 8.

The communication ports 20 are used for sharing data with the digital computer 8.

The communication ports 20 may comprise, for instance, universal serial bus (USB) ports for connecting a keyboard and a mouse to the digital computer 8.

The communication ports 20 may further comprise a data network communication port, such as IEEE 802.3 port, for enabling a connection of the digital computer 8 with a non-conventional device 10, which is an embodiment of an optimization solver.

The skilled addressee will appreciate that various alternative embodiments of the communication ports 20 may be provided.

The memory unit 22 is used for storing computer-executable instructions.

The memory unit 22 may comprise a system memory such as a high-speed random-access memory (RAM) for storing system control program (e.g., BIOS, operating system module, applications, etc.) and a read-only memory (ROM).

It will be appreciated that the memory unit 22 comprises, in one embodiment, an operating system module.

It will be appreciated that the operating system module may be of various types.

In one embodiment, the operating system module is OS X Yosemite manufactured by Apple™.

The memory unit 22 further comprises an application for solving a mixed-integer programming problem using a feasibility pump technique.

The memory unit 22 may further comprise an application for using the non-conventional device 10, not shown.

The memory unit 22 may further comprise non-conventional device data, not shown, such as a corresponding input data.

The non-conventional device 10 comprises an FPGA integrated circuit 26, referred to as an optimization solver, and a readout control system 24.

The readout control system 24 is used for reading the results from the optimization solver 26. The results from the readings are fed to the digital computer 8.

It will be appreciated that the readout control system 24 may be of various types.

Figure 2:
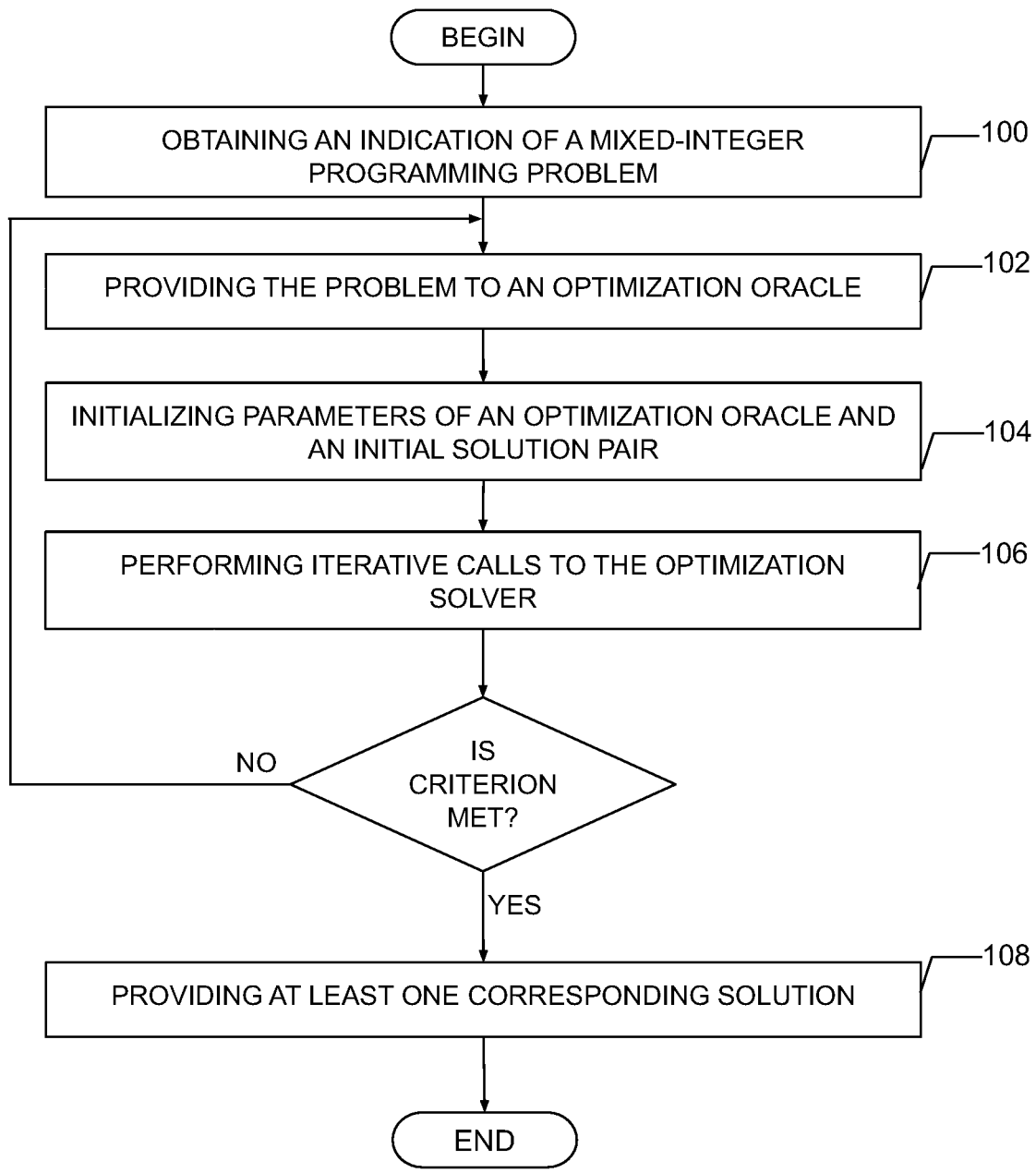
FIG. 2 is a flowchart that illustrates an embodiment of a method for solving a mixed-integer programming problem using a feasibility pump technique embedded in a Monte Carlo simulation framework.

Now referring to FIG. 2, there is shown an embodiment of a method for solving a mixed-integer programming problem.

According to processing step 100, an indication of the mixed-integer programming problem is obtained as an input. It will be appreciated that the mixed-integer programming problem may be of various types, as shown herein. In one embodiment, the objective function $f(x)$ is linear in the form $c^T x$, wherein $c \in \mathbb{R}^n$ is a coefficient vector. In another embodiment, the objective function $f(x)$ is quadratic, in the form $x^T Q x$, wherein $Q \in \mathbb{R}^{n \times n}$ is a coefficient matrix.

Figure 3:
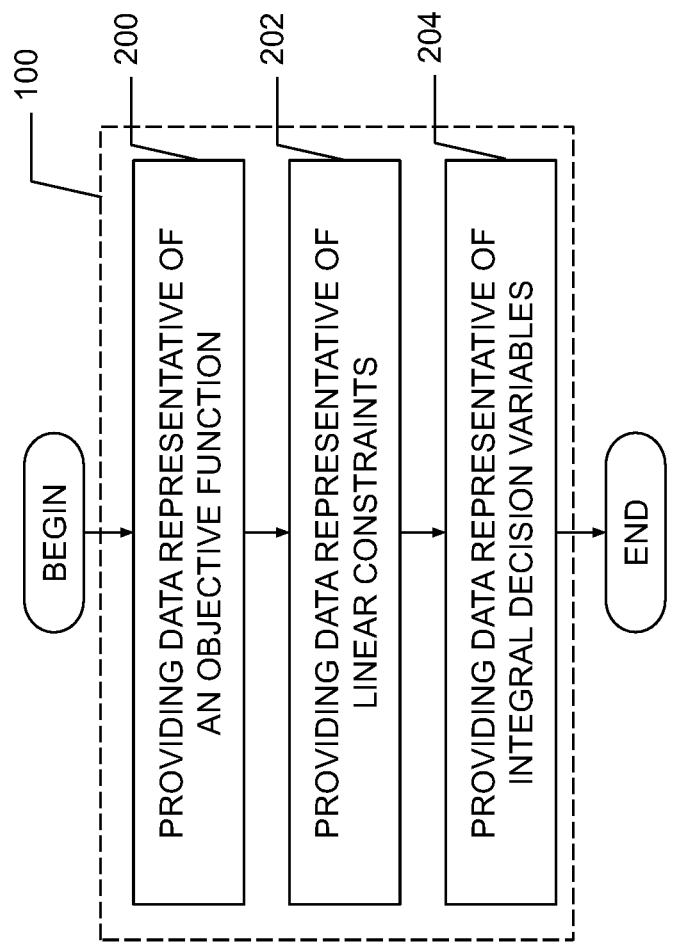
FIG. 3 is a flowchart that shows an embodiment for obtaining a mixed-integer programming problem.

More precisely and now referring to FIG. 3, there is shown an embodiment of how the mixed-integer programming problem is obtained.

According to processing step 200, data representative of an objective function of the mixed-integer programming problem is provided. In one embodiment, the objective function is characterized by arrays of coefficients and decision variables as $c^T x$, wherein $c=(c_1, c_2, \ldots, c_n)$ is a coefficients vector and $x$ $(x_1, x_2, \ldots, x_n)$ is a decision variables vector. In another embodiment, the objective function is characterized by a matrix of coefficients $Q \in \mathbb{R}^{n \times n}$ and the decision vector $x$ as $x^T Q x$.

Still referring to FIG. 3 and according to processing step 202, data representative of the linear constraints on the decision variables $x$ is provided. More precisely and in accordance with an embodiment, a constraint matrix $A \in \mathbb{R}^{m \times n}$ and a right-hand side vector $b=(b_1, b_2, \ldots, b_m)$ defining the LP-feasible polyhedron as: $\mathcal{P} = \{x: Ax \leq b\}$ are provided.

Still referring to FIG. 3 and according to processing step 204, data representative of the integral decision variables is provided. It will be appreciated that the decision variables in set $I \subseteq \{1, 2, \ldots, \}$ are subject to integrality constraints. More precisely, in the solution to the mixed-integer programming problem, the values of the decision variables must be integers. It will be appreciated that the rest of the variables may take any values in the final solution, either integer or real.

Now referring back to FIG. 2 and according to processing step 102, the mixed-integer programming problem is provided to an optimization oracle adapted for solving the mixed-integer programming using a feasibility pump technique embedded in a Monte Carlo simulation framework, an embodiment of which is shown in FIG. 1. It will be appreciated that processing steps 102, 104 and 106 are performed until a performance criterion is met. Accordingly, processing steps 102, 104 and 106 are performed in sequence a given number of times R. It will be appreciated that the performance criterion may be of various types. In one embodiment, the performance criterion is that the provided solution is of sufficient quality. In another embodiment, the performance criterion is that there is no or very little improvement in the provided solution in a given number of iterations.

In one embodiment, the R queries to the optimization oracle shown in FIG. 1 are performed in parallel while in another embodiment, the R queries are submitted once.

Still referring to FIG. 2 and according to processing step 104, for each query to the optimization oracle, the parameters of the optimization oracle and an initial solution pair are initialized. It will be appreciated that the parameters of the optimization oracle comprises, in one embodiment, Monte-Carlo simulation parameters, a list of neighborhood functions and a measure of fractionality.

Figure 4:
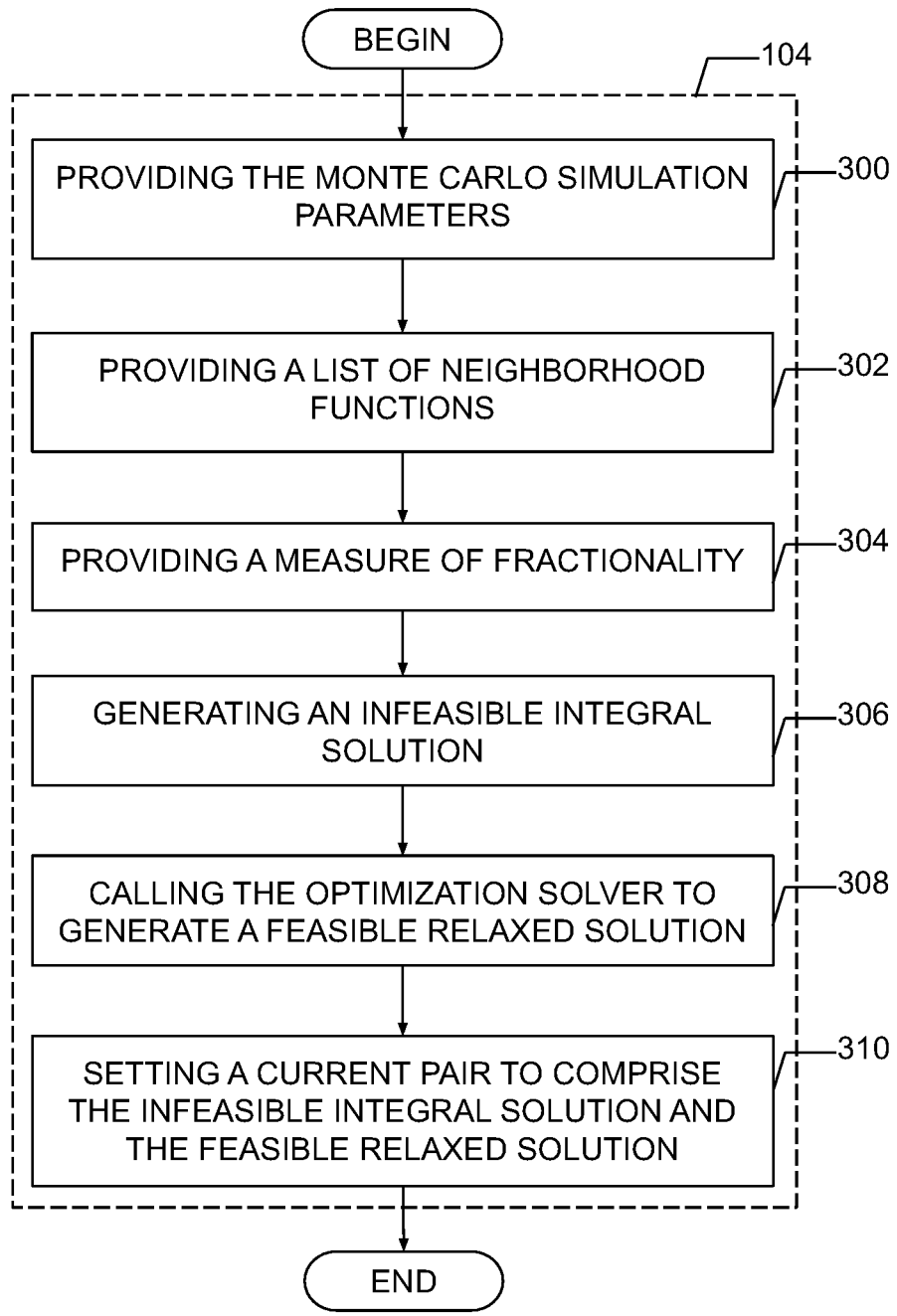
FIG. 4 is a flowchart that shows an embodiment for initializing the parameters of the optimization oracle.

Now referring to FIG. 4, there is shown an embodiment for initializing the parameters of the optimization oracle.

Still referring to FIG. 4 and according to processing step 300, the parameters characterizing how the Monte Carlo simulation is performed are provided.

In one embodiment wherein the Monte Carlo simulation framework is the simulated annealing algorithm, the list of input parameters comprises:

1) An annealing (simulation) scheduling vector $\alpha=(\alpha_1, \alpha_2, \ldots, \alpha_{n_r})$ with non-increasing values that are bounded between 0 and 1. It will be appreciated by the skilled addressee that there are various ways to generate the annealing scheduling vector. It may be a geometric schedule, a linear schedule, or a custom schedule. Moreover, it will be appreciated that the scheduling vector may be provided according to various embodiments. For instance and in accordance with one embodiment, the annealing scheduling vector is provided by a user.

2) An acceptance criterion to evaluate the acceptance of a new solution pair. In one embodiment, the acceptance criterion used is Metropolis. It will be appreciated that the probability of accepting the new solution pair is $$\mathbb{P} = e^{\frac{-\Delta E}{\alpha_i}}$$

wherein $\Delta E$ is the difference between the fitness of a current solution pair and a new solution pair and $\alpha_i$ is the current annealing point in the schedule at Monte Carlo simulation step i.

3) A random number generator that generates random numbers between 0 and 1.

In another embodiment wherein the Monte Carlo simulation framework is the parallel tempering algorithm, the list of input parameters comprises the parameters listed above as well as:

1) Number of Monte Carlo steps to perform a replica exchange move.

2) A replica-exchange acceptance criterion to evaluate the exchange of the solution pairs among $n_r$ replicas.

3) A rule on how the solution pairs on replicas are exchanged.

Still referring to FIG. 4 and according to processing step 302 a list of neighborhood functions denoted as $\mathcal{N}$ is provided. It will be appreciated that a neighborhood function may be used to generate a new solution pair in the vicinity of the current solution pair. In one embodiment, the neighborhood function is Randomized Rounding. In another embodiment, the neighborhood function is Weak Perturbation. In another embodiment, the neighborhood function is Strong Perturbation. In another embodiment, the neighborhood function is Weak Perturbation Domain. In another embodiment, the neighborhood function is Strong Perturbation Domain. It will be appreciated by the skilled addressee that each neighborhood function disclosed above is further disclosed by Pradignac et al. (N. Pradignac, M. Aramon, H. G. Katzgraber, A Feasibility Pump Algorithm Embedded in an Annealing Framework, In preparation, 2019).

Still referring to FIG. 4 and according to processing step 304, a measure of fractionality is provided in order to quantify the fitness of each solution pair.

More precisely, denoting the current solution pair as $(\bar{x}_c, \hat{x}_c)$ wherein $\bar{x}=(\bar{x}_1, \bar{x}_2, \ldots, \bar{x}_3)$ is the feasible relaxed solution and $\hat{x}=(\hat{x}_1, \hat{x}_2, \ldots, \hat{x}_n)$ is the infeasible integral solution, the fractionality may be defined as the $L_1$-norm distance between these two solutions: $\Sigma_{i \in I} |\bar{x}_i - \hat{x}_i|$. It will be appreciated that the fractionality value quantifies the fitness of a solution pair. The lower the fractionality value is, the closer the infeasible integral solution is to a feasible integral solution.

Still referring to FIG. 4 and according to processing step 306, the current infeasible integral solution is generated wherein a random integer value is assigned to each integer variable $(\hat{x}_i, \forall i \in I)$ within its bound, and the continuous variables $(\hat{x}_i, \forall i \in N \backslash I)$ are set to their corresponding values of the relaxed model's optimal solution. The relaxed model of the mixed-integer programming problem is solved, in one embodiment, using the optimization solver 26, shown in FIG. 1.

According to processing step 308, a relaxed feasible solution is generated by calling the optimization solver 26 shown in FIG. 1 to project the current infeasible integral solution back onto the LP-feasible polyhydron $\mathcal{P}$, generating a feasible relaxed solution. More precisely, the optimization solver 26 shown in FIG. 1 is called in order to solve the following optimization problem:

$$x = \mathrm{argmin}_x \left\{ (1-\alpha_1)\frac{\Delta(x, \hat{x})}{\gamma_1} + \alpha_1 \frac{f(x)}{\gamma_2} \right\}.$$

It will be appreciated that the parameter $\alpha_1$ is the initial element of the annealing schedule, $\Delta(x, \bar{x})$ is the fractionality measure defined in processing step 308, and $f(x)$ is the objective function of the mixed-integer programming problem. The parameters $\gamma_1$ and $\gamma_2$ are the normalization parameters used to normalize the contribution of each of the terms.

Still referring to FIG. 4 and according to processing step 310, the current solution pair is set to comprise the infeasible solution generated in processing step 306 and the feasible solution generated in processing step 308.

Now referring back to FIG. 2 and according to processing step 106, iterative calls to the optimization solver are performed until a stopping condition is met. It will be appreciated that this is performed in order to find at most one feasible integral solution to the mixed-integer programming problem for each providing. It will be appreciated that a call to the optimization solver might not result in a feasible integral solution before the stopping condition is reached.

Figure 5:
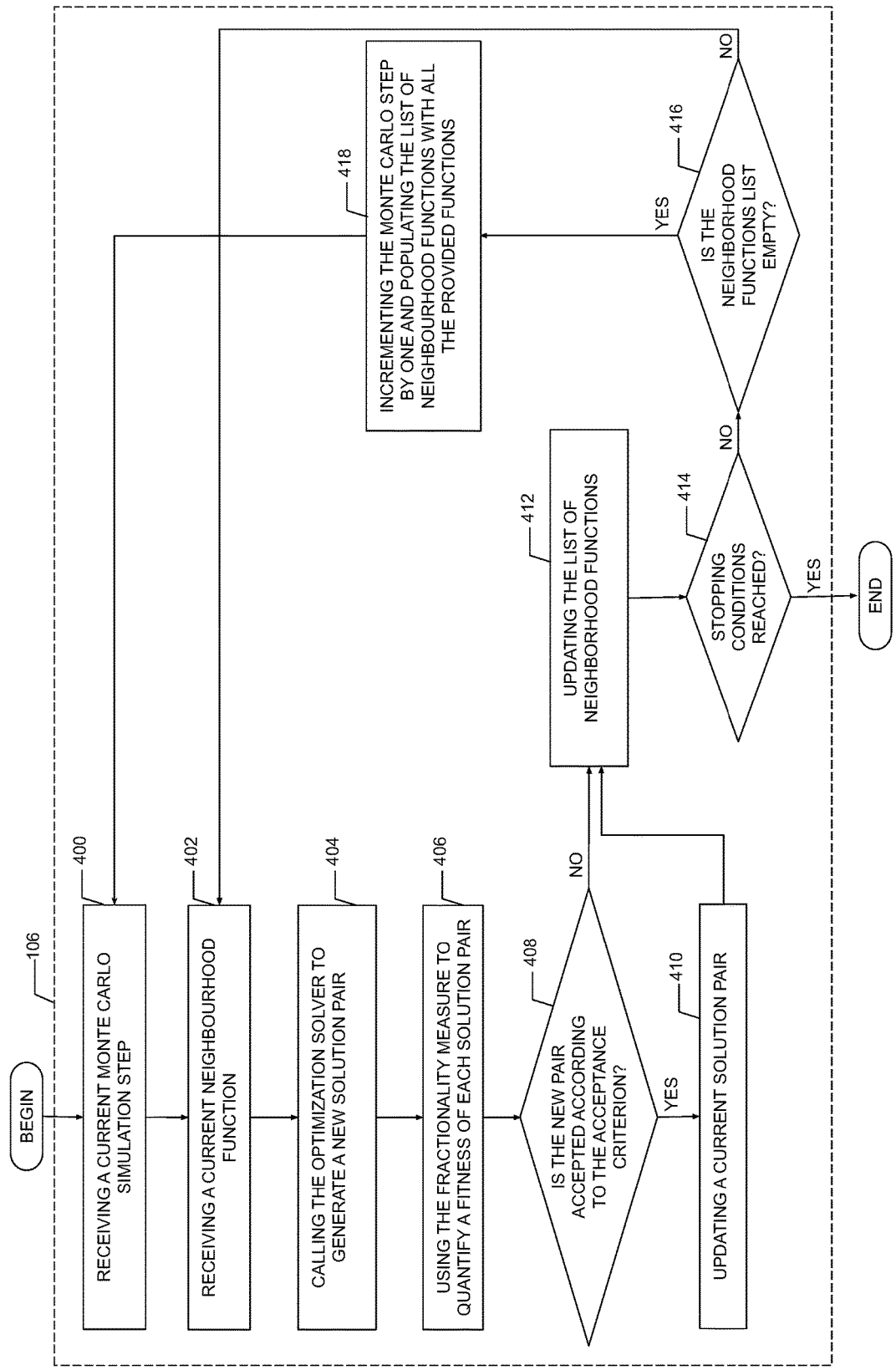
FIG. 5 is a flowchart that shows how the iterative calls to the optimization solver are performed in order to solve the mixed-integer programming problem.

More precisely and now referring to FIG. 5, there is shown an embodiment of the processing step 106.

According to processing step 400, the current Monte Carlo simulation step is received. The procedure starts from the initial step 1 with parameter $\alpha_1$.

Still referring to FIG. 5 and according to processing step 402, the list of current neighborhood functions is received. It will be appreciated that initially, the neighborhood list $\mathcal{N}$ includes $\eta$ different neighborhood functions as $\mathcal{N}=\{\mathcal{N}_1, \mathcal{N}_2, \ldots \mathcal{N}_\eta\}$. It will be further appreciated that the input to each neighborhood function is an infeasible integral solution.

Still referring to FIG. 5 and according to processing step 404, the optimization solver is called to generate a new solution pair. The current solution pair is denoted by $(\bar{x}_c, \tilde{x}_c)$. The neighborhood function $\mathcal{N}_j$ used in processing step 402 transfers the current infeasible integral solution $\tilde{x}_c$ to a new infeasible integral solution $\tilde{x}_n$. Passing the solution $\tilde{x}_n$ to the optimization solver, a new feasible relaxed solution, $\bar{x}_n$, is obtained by solving the following optimization problem $$\bar{x}_n = \operatorname{argmin}_x \left\{ (1-\alpha_i) \frac{\Delta(x, \tilde{x}_n)}{\gamma_1} + \alpha_i \frac{f(x)}{\gamma_2} \right\}.$$

Still referring to FIG. 5 and according to processing step 406, the fractionality measure provided in step 304 is used to first quantify the fitness of each solution pair and then to measure their difference.

In one embodiment, wherein the fractionality measure is the $L_1$-norm distance between the feasible relaxed solution and the infeasible integral solution, the difference between the fractionality of the new solution pair and the current pair is calculated as:

$$\Delta d = \Sigma_{i \in I} |\bar{x}_i^n - \tilde{x}_i^n| - \Sigma_{i \in I} |\bar{x}_i^c - \tilde{x}_i^c|$$

Still referring to FIG. 5 and according to processing step 408, the acceptance criterion provided in processing step 302 is applied to determine whether the new solution pair is accepted or not. The procedure for accepting or rejecting the new solution pair may comprise in one embodiment:

If $\Delta d \leq 0$, the new solution pair is accepted.

Otherwise, if $\alpha = 0$, the new solution pair is rejected.

Otherwise, the new solution pair is accepted following the acceptance criterion of the Monte Carlo simulation framework. In one embodiment, wherein the Monte Carlo framework is the simulated annealing algorithm, the random number generator provided in step 302 is first used to generate the random number r between 0 and 1. The new solution pair is then accepted if $$r \leq e^{\frac{-\Delta d}{\alpha_i}}$$

where $\alpha_i$ is the annealing schedule at the current Monte Carlo step i.

Still referring to FIG. 5 and according to processing step 410, if the acceptance criterion is met, the current solution pair is updated with the new solution pair.

According to processing step 412, the neighborhood function $\mathcal{N}_j$ used in processing step 404 is temporarily removed from the list of neighborhood functions $\mathcal{N}$.

Still referring to FIG. 5 and according to processing step 414, a check is performed in order to find out if the algorithm has reached at least one of the stopping condition from a list of stopping conditions. The list of the stopping conditions comprises in one embodiment:

A feasible integral solution is reached. More precisely, $\bar{x}_c$ is integral.

The number of Monte Carlo steps has reached a prespecified value $n_r$. In one embodiment, the value $n_r$ may be provided by a user.

The fractionality measure in the last k Monte Carlo steps has not improved.

Still referring to FIG. 5 and according to processing step 416, a check is performed in order to find out if the list of neighborhood functions $\mathcal{N}$ is an empty list.

In the case where the list of neighborhood functions $\mathcal{N}$ is empty and according to processing step 418, the Monte Carlo step is changed from i to i+1, the parameter $\alpha_i$ changes to $\alpha_{i+1}$, and the list of the neighborhood functions is reset at $\mathcal{N} = \{\mathcal{N}_1, \mathcal{N}_2, \ldots, \mathcal{N}_\eta\}$.

Now referring back to FIG. 2 and according to the processing step 108, the at least one corresponding solution is provided by the optimization oracle. It will be appreciated that the final results may include a number of different feasible integral solutions, one feasible integral solution, or no solution.

Moreover, it will be appreciated that the at least one corresponding solution may be provided according to various embodiments.

In one embodiment, the at least one corresponding solution is provided to the memory unit 22 of the digital computer 8.

In another embodiment, the at least one corresponding solution is provided to a remote processing device, not shown, operatively connected with the digital computer 8. It will be appreciated that the remote processing device may be connected with the digital computer 8 according to various data network. In one embodiment, the data network is selected in a group comprising at least one of a local area network (LAN), a metropolitan area network (MAN) and a wide area network (WAN). In one embodiment, the data network is the Internet.

In another embodiment, the at least one corresponding solution is displayed to a user interacting with the digital computer 8.

The application for solving a mixed-integer programming problem using a feasibility pump technique embedded in the Monte Carlo simulation framework comprises instructions for obtaining an indication of a mixed-integer programming optimization problem.

The application for solving a mixed-integer programming problem using a feasibility pump technique embedded in the Monte Carlo simulation framework further comprises instructions for, until a performance criterion is met, providing the mixed-integer programming optimization problem to an optimization oracle adapted for solving the mixed-integer programming optimization problem using a feasibility pump technique embedded in a Monte Carlo simulation framework and comprising an optimization solver, initializing parameters of an optimization oracle and an initial solution pair, the parameters comprising Monte-Carlo simulation parameters, a list of neighborhood functions and a measure of fractionality and performing iterative calls to the optimization solver until a stopping condition is met.

The application for solving a mixed-integer programming problem using a feasibility pump technique embedded in a Monte Carlo simulation framework comprises instructions for providing at least one corresponding solution obtained from the optimization oracle.

It will be appreciated that there is also disclosed a non-transitory computer readable storage medium for storing computer-executable instructions which, when executed, cause a computer to perform a method for solving a mixed-integer programming problem, the method comprising obtaining an indication of a mixed-integer programming optimization problem; until a performance criterion is met: providing the mixed-integer programming optimization problem to an optimization oracle adapted for solving the mixed-integer programming optimization problem using a feasibility pump technique embedded in a Monte Carlo simulation framework and comprising an optimization solver, initializing parameters of an optimization oracle and an initial solution pair, the parameters comprising Monte-Carlo simulation parameters, a list of neighborhood functions and a measure of fractionality, and performing iterative calls to the optimization solver until a stopping condition is met; and providing at least one corresponding solution obtained from the optimization oracle.

It will be appreciated that there is also disclosed an optimization oracle for solving a mixed-integer programming problem, the optimization oracle comprising a digital computer, and an optimization solver operatively connected to the digital computer, and wherein the solving of the mixed-integer programming problem comprises obtaining by the digital computer an indication of a mixed-integer programming optimization problem; until a performance criterion is met: providing the mixed-integer programming optimization problem to the optimization oracle adapted for solving the mixed-integer programming optimization problem using a feasibility pump technique embedded in a Monte Carlo simulation framework, initializing parameters of the optimization oracle and an initial solution pair, the parameters comprising Monte-Carlo simulation parameters, a list of neighborhood functions and a measure of fractionality, and performing iterative calls to the optimization solver until a stopping condition is met; and providing at least one corresponding solution obtained from the optimization oracle.

It will be appreciated that there is also disclosed a digital computer comprising a central processing unit; a communication port for operatively connecting the digital computer to an optimization solver; a memory unit comprising an application for solving a mixed-integer programming problem using a feasibility pump technique embedded in a Monte Carlo simulation framework, the application comprising: instructions for obtaining an indication of a mixed-integer programming optimization problem; instructions for, until a performance criterion is met: providing the mixed-integer programming optimization problem to an optimization oracle adapted for solving the mixed-integer programming optimization problem using a feasibility pump technique embedded in the Monte Carlo simulation framework, the optimization oracle comprising the digital computer and the optimization solver, initializing parameters of the optimization oracle and an initial solution pair, the parameters comprising Monte-Carlo simulation parameters, a list of neighborhood functions and a measure of fractionality, and performing iterative calls to the optimization solver until a stopping condition is met; and instructions for providing at least one corresponding solution obtained from the optimization oracle.

The system and the method disclosed herein are of great advantage for various reasons.

An advantage of one of more embodiments of the method disclosed herein is that they provide a method for solving a mixed-integer programming problem, the method utilizes randomization proactively by using the Monte Carlo simulation framework in order to reach the optimal solution faster than with prior art methods.

Another advantage of one or more embodiments of the system disclosed herein for solving the mixed-integer programming problem is that they operate faster than prior art apparatus used for solving the mixed-integer programming problem.

Another advantage of one or more embodiments of the method disclosed herein is that they may be implemented using FPGA or ASIC integrated circuit in one embodiment.

The invention claimed is:

1. A method for solving a mixed-integer programming problem, the method comprising:
obtaining an indication of a mixed-integer programming optimization problem;
until a performance criterion is met:
providing the mixed-integer programming optimization problem to an optimization oracle adapted for solving the mixed-integer programming optimization problem using a feasibility pump technique embedded in a Monte Carlo simulation framework, the optimization oracle comprising an optimization solver and a digital computer, wherein the optimization solver further comprises a field-programmable gate array operatively coupled to the digital computer or an application-specific integrated circuit operatively coupled to the digital computer,
initializing parameters of the optimization oracle and an initial solution pair, the parameters comprising Monte-Carlo simulation parameters, a full list of neighborhood functions and a measure of fractionality, and
performing iterative calls to the optimization solver until a stopping condition is met; and
providing at least one corresponding solution obtained from the optimization oracle.

2. The method as claimed in claim 1, wherein the obtaining of an indication of a mixed-integer programming problem comprises:
providing data representative of an objective function of the mixed-integer programming problem;
providing data representative of linear constraints associated with the mixed-integer programming problem; and
providing data representative of integral decision variables of the mixed-integer programming problem.

3. The method as claimed in claim 1, wherein the initializing of the parameters of the optimization oracle and the initial solution pair further comprises:
generating an infeasible integral solution;
calling the optimization solver to generate a feasible relaxed solution;
setting a current solution pair to comprise the infeasible integral solution and the feasible relaxed solution.

4. The method as claimed in claim 1, wherein the performing of the iterative calls to the optimization solver comprises:
receiving a current Monte Carlo simulation step;
receiving a current neighborhood function;
calling the optimization solver to generate a new solution pair;
using the measure of fractionality to quantify a fitness of each solution pair;
if an acceptance criterion is met,
updating a current solution pair with the new solution pair;
updating the list of neighborhood functions;
if the list of the neighborhood functions is empty:
incrementing the Monte Carlo simulation step by one and populating the list of neighborhood functions with the full list of neighborhood functions.

5. A non-transitory computer readable storage medium for storing computer-executable instructions which, when executed, cause a digital computer to perform a method for solving a mixed-integer programming problem, the method comprising:

obtaining an indication of a mixed-integer programming optimization problem;

until a performance criterion is met:

providing the mixed-integer programming optimization problem to an optimization oracle adapted for solving the mixed-integer programming optimization problem using a feasibility pump technique embedded in a Monte Carlo simulation framework, the optimization oracle comprising an optimization solver and the digital computer, wherein the optimization solver comprises a field-programmable gate array operatively coupled to the digital computer or an application-specific integrated circuit operatively coupled to the digital computer, initializing parameters of the optimization oracle and an initial solution pair, the parameters comprising Monte-Carlo simulation parameters, a list of neighborhood functions and a measure of fractionality, and performing iterative calls to the optimization solver until a stopping condition is met; and providing at least one corresponding solution obtained from the optimization oracle.

6. An optimization oracle for solving a mixed-integer programming problem, the optimization oracle comprising:

a digital computer, and an optimization solver operatively connected to the digital computer, wherein the optimization solver further comprises a field-programmable gate array operatively coupled to the digital computer or an application-specific integrated circuit operatively coupled to the digital computer, wherein the solving of the mixed-integer programming problem comprises:

obtaining by the digital computer an indication of a mixed-integer programming optimization problem;

until a performance criterion is met:

providing the mixed-integer programming optimization problem to the optimization oracle adapted for solving the mixed-integer programming optimization problem using a feasibility pump technique embedded in a Monte Carlo simulation framework, initializing parameters of the optimization oracle and an initial solution pair, the parameters comprising Monte-Carlo simulation parameters, a list of neighborhood functions and a measure of fractionality, and performing iterative calls to the optimization solver until a stopping condition is met; and providing at least one corresponding solution obtained from the optimization oracle.

7. A digital computer comprising:

a central processing unit;

a communication port for operatively connecting the digital computer to an optimization solver, wherein the optimization solver comprises a field-programmable gate array operatively coupled to the digital computer or an application-specific integrated circuit operatively coupled to the digital computer;

a memory unit comprising an application for solving a mixed-integer programming problem using a feasibility pump technique embedded in a Monte Carlo simulation framework, the application comprising:

instructions for obtaining an indication of a mixed-integer programming optimization problem;

instructions for, until a performance criterion is met:

providing the mixed-integer programming optimization problem to an optimization oracle adapted for solving the mixed-integer programming optimization problem using a feasibility pump technique embedded in the Monte Carlo simulation framework, the optimization oracle comprising the digital computer and the optimization solver, initializing parameters of the optimization oracle and an initial solution pair, the parameters comprising Monte-Carlo simulation parameters, a list of neighborhood functions and a measure of fractionality, and performing iterative calls to the optimization solver until a stopping condition is met; and instructions for providing at least one corresponding solution obtained from the optimization oracle.

* * * * *